United States Patent [19]

Rowe

[11] Patent Number: 4,654,045

[45] Date of Patent: Mar. 31, 1987

[54] PROCESS FOR PREPARATION OF CONCENTRATED ANIONIC RED DYE SOLUTIONS

[75] Inventor: Jay E. Rowe, Douglasville, Pa.

[73] Assignee: Crompton & Knowles Corporation, New York, N.Y.

[21] Appl. No.: 824,306

[22] Filed: Jan. 30, 1986

Related U.S. Application Data

[63] Continuation-in-part of Ser. No. 730,103, May 3, 1985, abandoned.

[51] Int. Cl.$^4$ .................. C09B 67/00; C09B 29/00
[52] U.S. Cl. ................................. 8/527; 8/604; 8/683; 8/924
[58] Field of Search ................... 8/527, 604, 683

[56] References Cited

U.S. PATENT DOCUMENTS

| | | | |
|---|---|---|---|
| 4,087,245 | 5/1978 | Kramer et al. | 8/527 |
| 4,198,203 | 4/1980 | Groll et al. | 8/527 |
| 4,282,000 | 8/1981 | Groll et al. | 8/527 |

*Primary Examiner*—A. Lionel Clingman

[57] ABSTRACT

The present invention is a process for the preparation of concentrated anionic red dye solutions which are storage stable. The process allows manufacture of a solution of a dye having the formula:

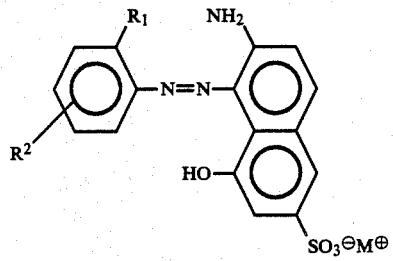

wherein
$R_1$ is $-SO_2N(CH_2CH_2CH_2CH_3)_2$, $-SO_2N(C_6H_5)(CH_2CH_3)$, $-SO_2N(CH_3)(C_6H_{11})$, or $-CF_3$;
$R_2$ is $-H$, $-Cl$ or

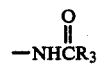

and $R_3$ is lower alkyl
M is

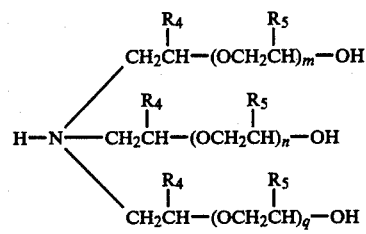

wherein
$R_4$ and $R_5$ are $-H$ or $-CH_3$ independently and $m+n+q \leq 9$, but $> 0$,
by reacting a dye having the structure:

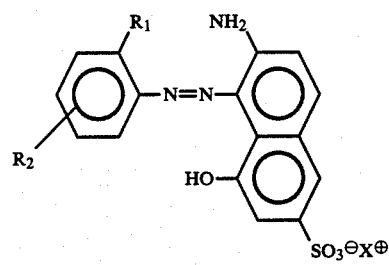

wherein
$R_1$ is $-SO_2N(CH_2CH_2CH_2CH_3)_2$, $-SO_2N(C_6H_5)(CH_2CH_3)$, $-SO_2N(CH_3)(C_6H_{11})$, or $-CF_3$;
$R_2$ is $-H$, $-Cl$ or

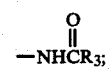

wherein
$R_3$ is lower alkyl, and
X is $NH(R_6)_3$,
wherein $R_6$ is H or a lower alkyl, in a mixture of water and a water soluble organic solvent with a polyhydroxyalkoxyalkylamine having the structure:

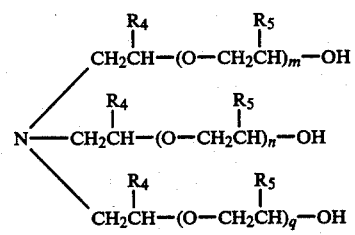

under conditions which cause expulsion of the volatile amine $N(R_6)_3$.

12 Claims, No Drawings

PROCESS FOR PREPARATION OF CONCENTRATED ANIONIC RED DYE SOLUTIONS

BACKGROUND OF THE INVENTION

This application is a continuation-in-part of Ser. No. 06/730,103, filed May 3, 1985, now abandoned, A. Clingman examiner, Jay Rowe inventor, CONCENTRATED ANIONIC RED DYE SOLUTIONS.

Anionic dyes in the form of solutions offer several important advantages to the dyer of nylon textiles, especially nylon carpeting. The use of dye solutions eliminates the dust pollution and contamination which normally accompany the handling of dyes in the powder form. Dye solutions miscible in water obviate the difficulty of mixing and dissolving powders. Because of their flow character, dye solutions are amenable to use in automatic pumping devices.

Heretofore, the problems encountered in the use of conventional dye solutions have included the inability to attain high concentration liquids, thereby necessitating large storage supplies, and the ocurrence upon aging of crystal growth as well as layering. It is an object of the present invention to provide storage stable, concentrated anionic red dye solutions which exhibit consistent viscosity and good compatibility with other anionic dye solutions. In addition, the dyeings obtained using these solutions exhibit both good brightness and generally high lightfastness.

U.S. Pat. No. 4,087,245 to Kramer et. al. discloses a process for preparing a concentrated anionic dye solution, wherein the alkali metal or ammonium salt of an anionic dye is reacted with an equivalent amount of acid, for example, hydrochloric acid, in the presence of a suitable nitrogen base such as an ethoxylated triethanolamine in a water-soluble organic solvent. A salt which is a combination of the acid anion and the dye cation precipitates, e.g. sodium chloride, and is filtered off. The dye anion in solution becomes associated with the protonated nitrogen base. The dye solution obtained by Kramer et al. may afterwards be diluted with water, although the original reaction mixture may contain a maximum of 20 percent water.

The process of Kramer et al. suffers from several disadvantages, which are believed to preclude commercial success. The process is relatively complicated, involving the necessity of an acid-base reaction with a strong acid such as hydrochloric acid or sulfuric acid. Moreover, the production of an unwanted salt in equimolar or greater quantities with the dye molecule necessitates burdensome filtration steps and leaves undesirable salt in the final solution which adversely affects the stability of the final solutions.

U.K. Pat. GB No. 2015018 B to Koll discloses a process for preparing a high concentration dyestuff solution, employing a strong acid to produce a salt-to-salt conversion, resulting in the amine salt of the dye and salt such as sodium chloride, the latter in quantities of up to 500 mol % relative to the dyestuff. The co-production of this undesirable salt necessitates repeatedly subjecting the solution to a membrane separation, so as to obtain less than 0.1% of sodium chloride relative to the dye.

Applicant has discovered a process wherein the use of an acid for a salt-to-salt conversion is obviated and the co-production of an undesirable salt is eliminated. Instead, by the use of selected components, applicant is able to carry out a process to form stable, concentrated solutions of certain anionic red dyes which exhibit the desirable properties previously mentioned. Moreover, the solution is readily manufactured, not necessitating burdensome filtration or separation unit processes.

Applicant's process provides concentrated liquid solutions of important commercial acid red dyes which exhibit excellent working properties for the dyeing of nylon, and give dyeings of good lightfastness and ozone-fastness and brightness. This composition is especially useful as a high lightfast acid red dye for nylon and similar fibers.

DETAILED DESCRIPTION OF THE INVENTION

The purpose of the present invention is to provide an economical commercial process for manufacture of concentrated liquid forms of anionic monosulfonic red monoazo dyes having the structure I:

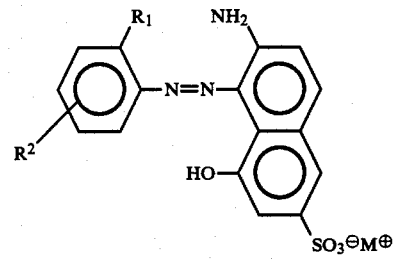

wherein
$R_1$ is $-SO_2N(CH_2CH_2CH_2CH_3)_2$, $-SO_2N(C_6H_5)(CH_2CH_3)$, $-SO_2N(CH_3)(C_6H_{11})$, or $-CF_3$;
$R_2$ is $-H$, $-Cl$ or

and
$R_3$ is lower alkyl.
M is:

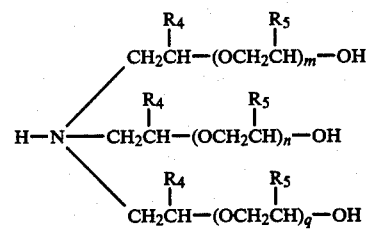

wherein
$R_4$ and $R_5$ are $-H$ or $-CH_3$ independently and
$m+n+q \leq 9$, but $>0$.

The process for the preparation of a concentrated solution of an anionic monosulfonic red monoazo dye having the above Structure I is achieved by reacting the dye structure II:

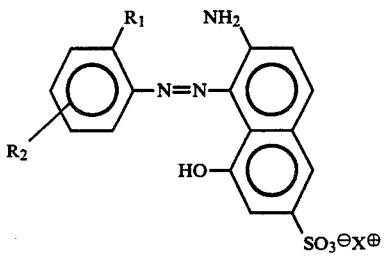

wherein
R₁ is —SO₂N(CH₂CH₂CH₂CH₃)₂, —SO₂N(C₆H₅)(CH₂CH₃), —SO₂N(CH₃)(C₆H₁₁), or —CF₃;
R₂ is —H, —Cl or

wherein
R₃ is lower alkyl, and
X is NH(R₆)₃, and
R₆ is H or a lower alkyl,
in a mixture of water and a water soluble organic solvent with a polyhydroxyalkoxyalkylamine having a structure III:

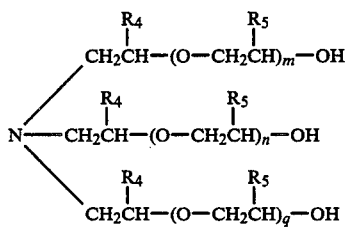

under conditions which cause expulsion of the volatile amine N(R₆)₃.

Dyes to which this process is applicable include e.g. C.I. Acid Red 266, 377, 361, and 57, dyes of German Pat. No. 2,172,770 (GB. No. 1,579,414) and especially the dye having the structure:

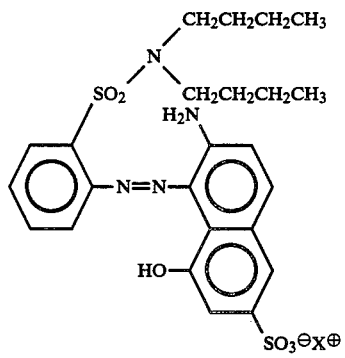

wherein X is HN(R₆)₃ and wherein R₆ is H or lower alkyl.

The initial dye employed is preferably in an amount by weight of 20 to 30%. The initial salt form of preference is when X is NH₄.

Suitable water soluble organic solvents are for example: polyglycol monoalkyl ethers such as diethyleneglycol monomethyl ether, diethyleneglycol monobutyl ether, dipropyleneglycol monomethyl ether and tripropyleneglycol monomethyl ether. The propyleneglycol based solvents are particularly favored because it has been determined, in recent short-term, subchronic teratology and metabolism studies on animals, that the toxicological effects causing particular concern with respect to the ethylene glycol based ethers are not exhibited by the propylene glycol ethers.

The polyglycol monoalkylether selected should be used in a range, by weight of 5 to 50% of the composition. Preferably, the polyglycol monoalkylether should be about 10 to 30% and, most preferably, about 20 to 25% by weight of the composition. The water is preferably deionized to remove ions of such metals as Ca, Mg, Fe, and of other heavy metals.

The final salt form of the dye in the product manufactured by this process is generated by using, for example: a polyhydroxyalkoxyalkylamine which is used in the amount of 5 to 40% by weight of the composition. Preferably, the amine is used in the amount of about 10 to 20% by weight. It has been found that the desired properties of the dye solution are achieved when $m+n+q \leq 9$ but $<0$ according to Structure I. Polyhydroxyalkoxyalkylamines outside this range were found not to give solutions having the good appearance, viscosity, and absence of crystal growth of solutions prepared according to the present invention. The preferred polyhydroxyalkoxyalkylamine is:

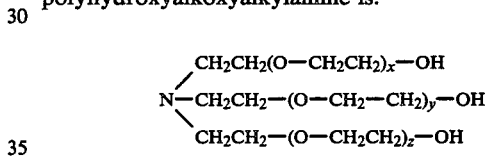

wherein $x+y+z$ is $>0$ and $<4$

The exact weight percent of the components of the system employed varies according to the particular Structure I red dye incorporated. The solubility and solution stability character of each Structure I red dye is directly related to the nature and identity of the R and R substituents. Consequently, the particular component percentages which will produce a dye solution exhibiting the desired characteristics for a given Structure I compound cannot be predicted with certainty. In practice, as will be readily understood by those skilled in the art, a series of varying component percentages must be prepared and evaluated on the basis of storage stability and working properties.

The unique characteristic of the process for obtaining a concentrated solution of the dye of Structure I is the displacement and explusion of the volatile amine N(R₆)₃ by the amine of Structure III in the aqueous organic solvent mixture. Explusion of the volatile amine may be effected autogenously or by passing an inert gas through the mixture of dye and solvents. A prefered process for obtaining a solution of the anionic monosulfonic red monoazo dye of Structure I is driving off the ammonia or lower alkylamine of the initial dye at elevated temperature. This process uses a temperature range of 50° to 100° C. and preferably 60° to 80° C. This reaction has been illustrated previously be interacting Structure II and Structure III to obtain Structure I.

The described process that produces Structure I is superior to the prior art because the sodium content of the resulting liquids is greatly reduced. Because of the extremely low sodium content, the resulting liquids display excellent storage stability. The higher the sodium level of the dye solution, the shorter is the period of time the liquid will remain stable to crystal growth. The sodium salts of these dyes have much lower solubility in the described solvent mixtures then have the polyhydroxyalkoxyalkylammonium salts required in this process.

Because the process described herein eliminates the original dye cation by evolution in the form of its volatile free amine, inorganic salts are not generated and consequently filtration is unnecessary. In terms of practical application and economics this procedure is advantageous.

As pointed out previously, the use of strong acid as is necessitated in Kramer is eliminated in the above process, thereby simplifying the procedure and avoiding the potential hazards associated with the use and handling of these chemicals.

EXAMPLE 1

A concentrated solution of the dye of the following structure:

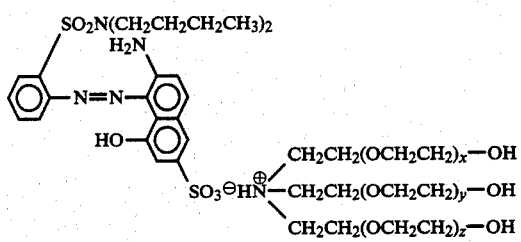

wherein $x+y+z>0$ and $<4$
was prepared by adding 200 parts of the moist dye filtercake of structure:

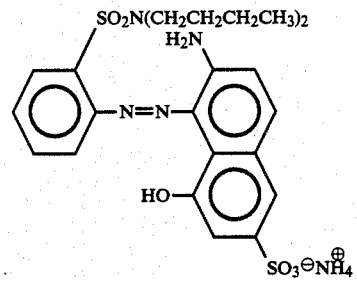

(% moisture—30; Na content 0.20%) to a mixture of 120 parts diethyleneglycol monobutyl ether, 80 parts of the polyhydroxyalkoxyalkylamine of structure:

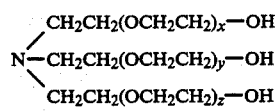

wherein $x+y+z>0$ and $<4$
and 160 parts of deionized water and heating at 60° C. until the evolution of ammonia gas ceased (approximately 2 hours). The dye dissolved to give a dark red liquid which exhibited good storage stability and complete miscibility with water.

EXAMPLE 2

A red dye liquid having similar properties to the solution prepared in Example 1 was obtained using the method described in Example 1, substituting 120 parts diethyleneglycol monomethyl ether for diethyleneglycol monobutyl ether.

EXAMPLE 3a

A concentrated solution of the dye described in Example 1 was prepared according to the method of Example 1 wherein 200 parts of the same dye filtercake, 108 parts dipropyleneglycol monomethyl ether, 51 parts of the polyhydroxyalkoxyalkylamine described in Example 1 and 185 parts of deionized water were used. A sample of this liquid remained free of crystal growth and layering after shelf storage for six months. Similarly, a sample exposed to 6 cycles of storage at 5° C. for 2 days followed by storage at ambient temperature for 2 days showed no crystal growth.

The solution imparts bright red color to polyamide fibers when applied from an aqueous dye bath. The dyeings exhibit good light and ozone fastness.

EXAMPLE 3b

The example is included to demonstrate the necessity in the method of using the dye as a salt form wherein the cation is derived from a volatile amine. A moist filtercake (100 parts) of the dye of structure:

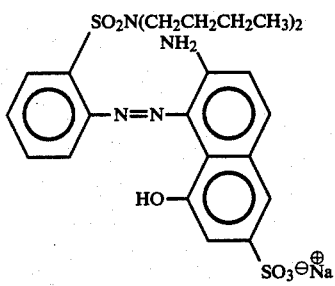

(% moisture—34.4%; Na content 2.6%), was added to a mixture of 44 parts dipropyleneglycol monomethyl ether, 20 parts of the polyhydroxyalkoxyalkylamine described in Example 1 and 55 parts of deionized water. The mixture was stirred 2 hours at 60° C. and then allowed to cool to ambient temperature. Upon cooling the entire mass solidified, even though the weight percentages of dye and solvents in the mixture were similar to those in Example 3a.

EXAMPLE 4

A concentrated solution of the dye described in Example 1 was prepared according to the method of Example 1 using 100 parts of the moist dye filtercake described in Example 1, 50 parts dipropyleneglycol monomethyl ether, 90 parts deionized water and 30 parts of the polyhydroxyalkoxyalkylamine described by the following structure:

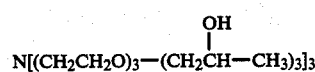

The resulting solution remained stable to crystal growth and sedimentation at ambient temperature for 3 months. Its dyeing properties were similar to those of the liquid prepared in Example 3a.

EXAMPLES 5-10

The following solutions of the dye described in Example 1 were prepared in manner similar to that described in Example 1. As the following Table I indicates, the relative proportions of the liquid constituents were varied to determine the effect on stability and viscosity of the concentrated dye solution. The dye was added in the form of the moist presscake described in Example 1. The polyhydroxyalkoxyalkylamine used was the same as described in Example 1. The numbers listed in each column indicate parts by weight. Each of the samples was stable at ambient temperature for a minimum of 8 weeks and no significant change in viscosity was noted during that period. The viscosity readings were determined on the solutions at ambient temperature using a Brookfield Synchro-Lectric Viscometer, Model RVT, spindle number 4, and 50 rpm.

TABLE I

| EXAMPLE | Ia FILTERCAKE | DIPROPYLENEGLYCOL MONOMETHYL ETHER | TRIS-[2-HYDROXY-ETHOXY)ETHYL]AMINE | DEIONIZED WATER | VISCOSITY (CENTIPOISE |
|---|---|---|---|---|---|
| 5 | 100 | 40 | 30 | 100 | 212 |
| 6 | 100 | 50 | 30 | 90 | 132 |
| 7 | 100 | 60 | 30 | 80 | 92 |
| 8 | 100 | 70 | 30 | 70 | 76 |
| 9 | 100 | 50 | 25 | 95 | 84 |
| 10 | 100 | 50 | 35 | 85 | 84 |

Dyeings prepared from dye solutions of the present invention exhibit superior lightfastness. The solutions are suitable for dyeing nylon and and other polyamide fibers, and are particularly advantageous for application of nylon carpeting. Although detailed examples have been provided to illustrate the invention, it will be understood by those skilled in the art that other similar high concentrated anionic monosulfonic red monoazo dye solutions may be prepared by the process of this invention.

I claim:

1. A process for the preparation of a concentrated solution of an anionic monosulfonic red monoazo dye having the Structure I:

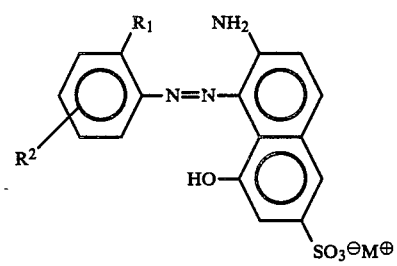

wherein
$R_1$ is $-SO_2N(CH_2CH_2CH_2CH_3)_2$, $-SO_2N(C_6H_5)(CH_2CH_3)$, $-SO_2N(CH_3)(C_6H_{11})$ or $-CF_3$;
$R_2$ is $-H$, $-Cl$ or

and
$R_3$ is lower alkyl;
M is

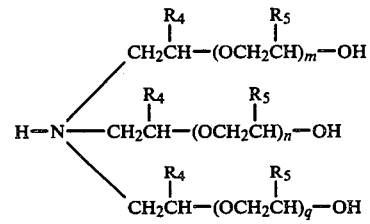

wherein $R_4$ and $R_5$ are $-H$ or $-CH_3$ independently and $m+n+q \leq 9$, but $>0$,
comprising reacting a dye having the structure:

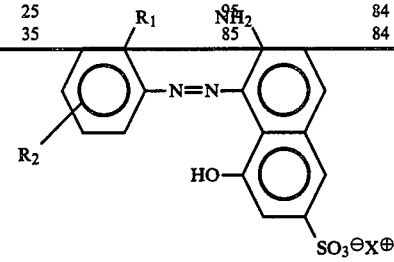

wherein
$R_1$ is $-SO_2N(CH_2CH_2CH_2CH_3)_2$, $-SO_2N(C_6H_5)(CH_2CH_3)$, $-SO_2N(CH_3)(C_6H_{11})$, or $-CF_3$;
$R_2$ is $-H$, $-Cl$ or

wherein
$R_3$ is lower alkyl, and
X is $NH(R_6)_3$, and
$R_6$ is H or a lower alkyl, in a mixture of water and a water soluble oganic solvent with a polyhydroxyalkoxyalkylamine having the structure:

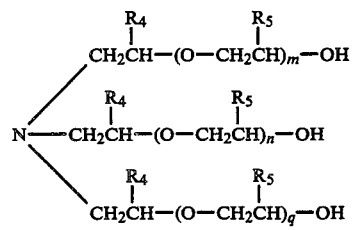

under conditions which cause expulsion of the volatile amine $N(R_6)_3$.

2. The process of claim 1, wherein said water soluble organic solvent is dipropyleneglycol monomethyl ether.

3. The process of claim 1, wherein said water soluble organic solvent is tripropyleneglycol monomethyl ether.

4. The process of claim 1, wherein said polyhydroxyalkoxyalkylamine is of the formula:

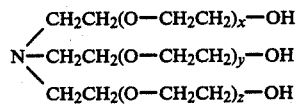

wherein x+y+z is >0 and <4.

5. The process according to claim 1, wherein the initial dye has the structure:

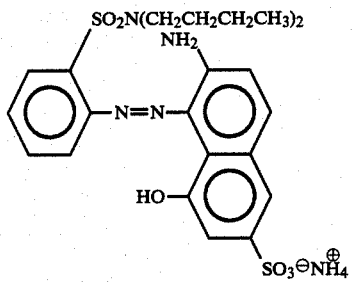

and the solution obtained contains the dye of the structure:

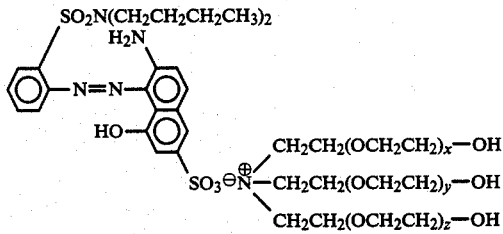

wherein x+y+z is >0 and <4, and the water soluble solvent is dipropyleneglycol monomethyl ether.

6. The process according to claim 1, wherein the initial dye has the structure:

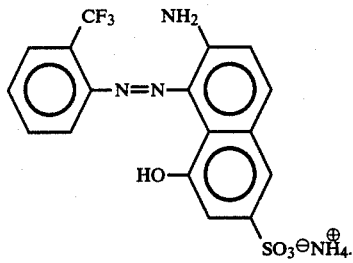

7. The process according to claim 1, wherein the initial dye has the structure:

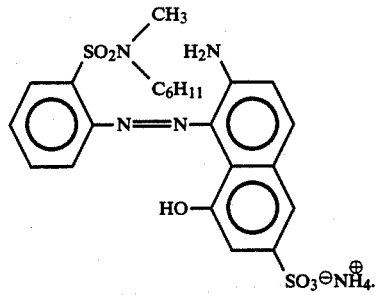

8. The process according to claim 1, wherein the initial dye has the structure:

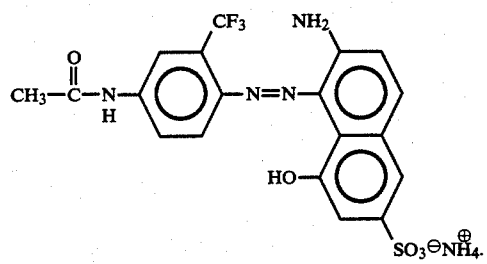

9. The process according to claim 1, wherein the initial dye has the structure:

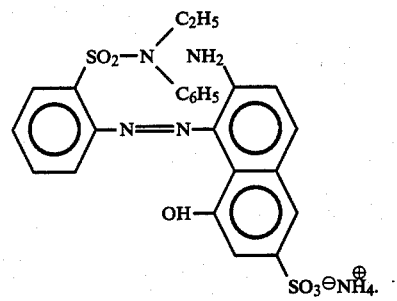

10. The process of claim 1, wherein said water soluble organic solvents are by weight 5 to 50% of the composition, preferably 20 to 25%.

11. The process of claim 1, wherein said polyhydroxyalkoxyalkylamines are by weight 5 to 40% of the composition, preferably 10 to 20%.

12. The process of claim 1, wherein said initial dye is present in an amount by weight of 20 to 30%.

* * * * *